United States Patent
Li et al.

(10) Patent No.: US 6,615,117 B2
(45) Date of Patent: Sep. 2, 2003

(54) ATTITUDE DETERMINATION SYSTEM AND METHOD WITH OUTER-LOOP GYRO SCALE-FACTOR NON-LINEARITY CALIBRATION

(75) Inventors: Rongsheng Li, Hacienda Heights, CA (US); Yeong-Wei Wu, Rancho Palos Verdes, CA (US); David L. Augenstein, Hermosa Beach, CA (US)

(73) Assignee: The Boeing Company, Seattle, WA (US)

( * ) Notice: Subject to any disclaimer, the term of this patent is extended or adjusted under 35 U.S.C. 154(b) by 50 days.

(21) Appl. No.: 09/993,022

(22) Filed: Nov. 13, 2001

(65) Prior Publication Data

US 2003/0093194 A1 May 15, 2003

(51) Int. Cl.[7] ............................. G06F 19/00; B64G 1/28
(52) U.S. Cl. ...................... 701/13; 701/221; 701/214; 342/357.14; 244/158 R

(58) Field of Search ................... 701/13, 214, 221, 701/222, 226; 244/158 R, 171, 164; 342/357.14, 357.11; 702/85

(56) References Cited

U.S. PATENT DOCUMENTS

| 4,347,730 A | * | 9/1982 | Fisher et al. .................. 73/1.76 |
| 4,488,249 A | * | 12/1984 | Baker ........................... 702/92 |
| 5,367,898 A | * | 11/1994 | Matsuzaki ................... 73/1.77 |

* cited by examiner

*Primary Examiner*—Tan Q. Nguyen
(74) *Attorney, Agent, or Firm*—Gates & Cooper LLP

(57) ABSTRACT

A method and apparatus for calibrating rate sensor measurements to compensate for rate sensor scale factor non-linearities. An outer loop compensator compares current rate sensor scale factor estimates with the current scale factor non-linearity compensation, and deviations from the current non-linearity compensation are corrected in an updated compensation.

27 Claims, 7 Drawing Sheets

ATTITUDE DETERMINATION SYSTEM AND METHOD WITH OUTER-LOOP GYRO SCALE-FACTOR NON-LINEARITY CALIBRATION

CROSS-REFERENCE TO RELATED APPLICATIONS

This application is related to the following co-pending and commonly assigned patent application(s), all of which applications are incorporated by reference herein:

application Ser. No. 09/212,454, entitled "AUTONOMOUS GYRO SCALE FACTOR AND MISALIGNMENT CALIBRATION," filed on Dec. 16, 1998, by Rongsheng Li, Yeong-Wei Wu and Garry Didinsky, now U.S. Pat. No. 6,298,288.

STATEMENT OF RIGHTS OWNED

This invention was made with Government support. The Government has certain rights in this invention.

BACKGROUND OF THE INVENTION

1. Field of the Invention

The present invention relates to systems and methods for spacecraft navigation, and in particular to a spacecraft attitude determination system for correcting gyro scale factor non-linearity.

2. Description of the Related Art

Satellite navigation systems typically include an attitude determination system. Attitude determination systems typically comprises one or more rate sensors (which provide measurements of the rotation rate of the spacecraft) and one or more attitude sensors (which measure the attitude of the spacecraft). Rate sensors may include mechanical gyros, ring laser gyros (RLGs), or similar devices. Attitude sensors include, for example, sun sensors, earth sensors, and/or star trackers. Typically, sun and earth sensors are used to provide a rough spacecraft attitude estimate (useful, for example in recovering from large spacecraft motions), while the star trackers provide a more accurate attitude estimates.

For agile spacecraft, gyro scale factor and misalignment errors contribute significantly to spacecraft attitude determination errors. To ameliorate this problem, a Kalman filter can be used to generate estimates of the spacecraft attitude, gyro scale factors and gyro misalignments. Using such estimates, substantial performance improvements can be obtained. However, the Kalman filters used in such designs typically assume that the gyro scale factors are constant across different measured angular rates. What is needed is an attitude control system that compensates for rate sensor scale factor errors, without rendering the Kalman filter algorithms unnecessarily complex. The present invention satisfies that need.

SUMMARY OF THE INVENTION

To address the requirements described above, the present invention discloses a method and apparatus for calibrating rate sensor measurements to compensate for rate sensor scale factor non-linearities. The method comprises the steps of generating a current rate sensor scale factor estimate; generating a deviation of the scale factor estimate from a current scale factor non-linearity correction mapping; generating an updated scale factor non-linearity correction mapping from the deviation of the scale factor estimate from the current scale factor non-linearity correction mapping; and mapping the rate sensor measurement according to the current scale factor non-linearity correction mapping. The apparatus comprises a plurality of modules that can be implemented in hardware or in software by one or more processors. The modules include a first module for estimating a gyro scale factor; a second module, communicatively coupled to the first module, for generating a deviation of the scale factor estimate from a current scale factor non-linearity correction mapping; a third module, communicatively coupled to the second module for generating an updated scale factor non-linearity correction mapping from the deviation of the scale factor estimate from the current scale factor non-linearity correction mapping; and a fourth module, communicatively coupled to the third module, for mapping the rate sensor measurement according to the current scale factor non-linearity correction mapping.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Attitude Control Systems

Figure 1:
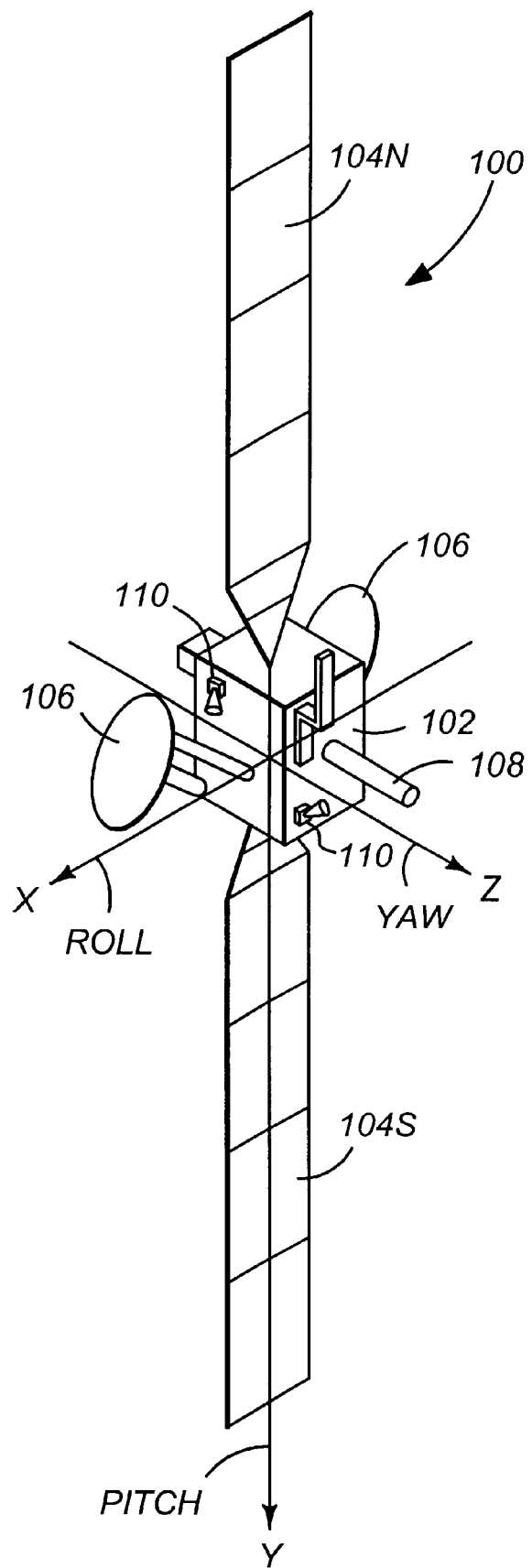
FIG. 1 illustrates a three-axis stabilized satellite or spacecraft.

FIG. 1 illustrates a three-axis stabilized satellite or spacecraft 100. The spacecraft 100 is preferably situated in a stationary orbit about the Earth. The satellite 100 has a main body 102, a pair of solar panels 104, a pair of high gain narrow beam antennas 106, and a telemetry and command omni-directional antenna 108 which is aimed at a control ground station. The satellite 100 may also include one or more sensors 110 to measure the attitude of the satellite 100. These sensors may include sun sensors, earth sensors, and star sensors. Since the solar panels are often referred to by the designations "North" and "South", the solar panels in FIG. 1 are referred to by the numerals 104N and 104S for the "North" and "South" solar panels, respectively.

The three axes of the spacecraft 10 are shown in FIG. 1. The pitch axis P lies along the plane of the solar panels 140N and 140S. The roll axis R and yaw axis Y are perpendicular to the pitch axis P and lie in the directions and planes shown. The antenna 108 points to the Earth along the yaw axis Y.

Figure 2:
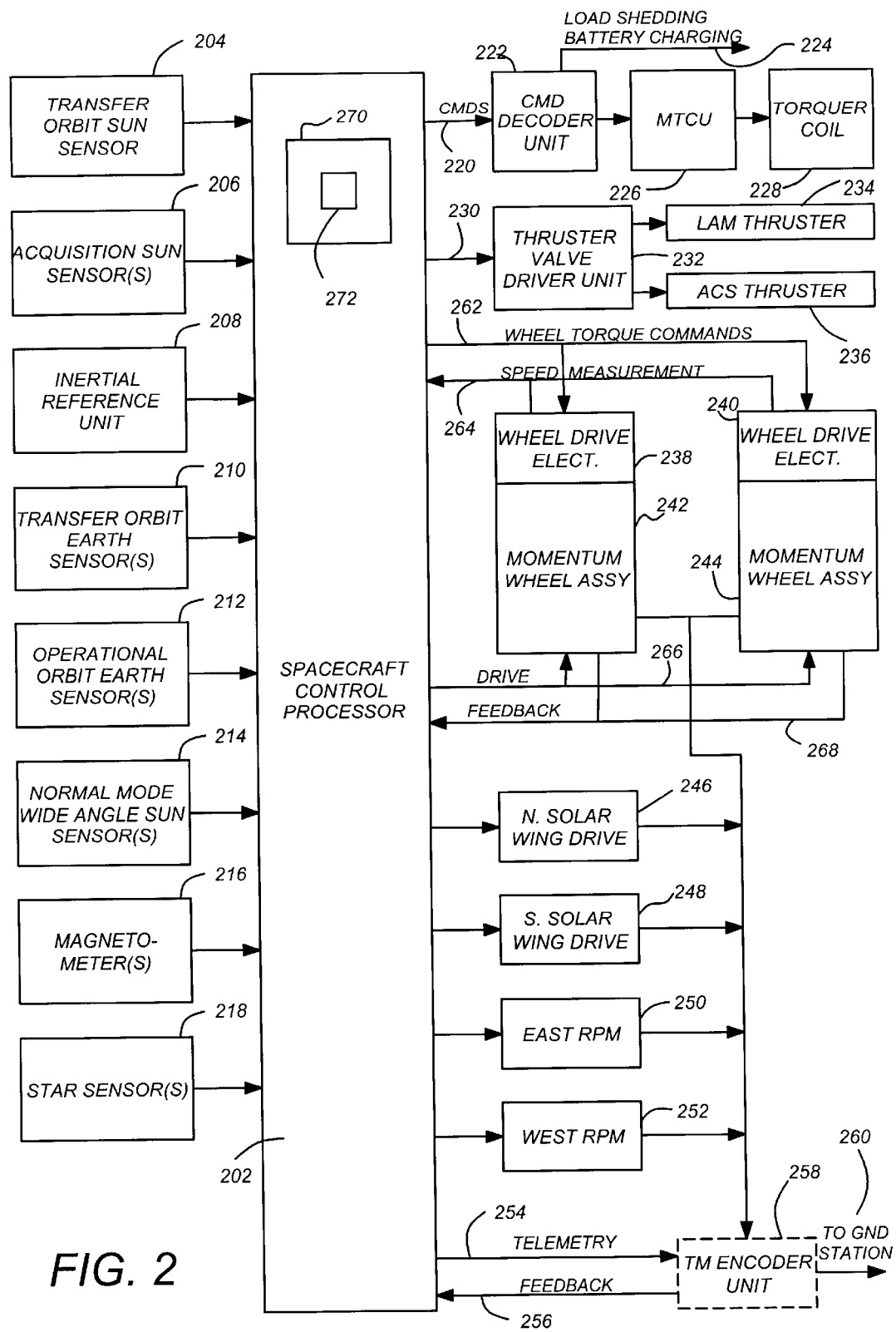
FIG. 2 is a diagram depicting the functional architecture of a representative attitude control system.

FIG. 2 is a diagram depicting the functional architecture of a representative attitude control system. Control of the spacecraft is provided by a computer or spacecraft control processor (SCP) 202. The SCP performs a number of functions which may include post ejection sequencing, transfer orbit processing, acquisition control, stationkeeping control, normal mode control, mechanisms control, fault protection, and spacecraft systems support, among others. The post ejection sequencing could include initializing to assent mode and thruster active nutation control (TANC). The transfer orbit processing could include attitude data processing, thruster pulse firing, perigee assist maneuvers, and liquid apogee motor (LAM) thruster firing. The acquisition control could include idle mode sequencing, sun search/acquisition, and Earth search/acquisition. The stationkeeping control could include auto mode sequencing, gyro calibration, stationkeeping attitude control and transition to normal. The normal mode control could include attitude estimation, attitude and solar array steering, momentum bias control, magnetic torquing, and thruster momentum dumping (H-dumping). The mechanisms mode control could include solar panel control and reflector positioning control. The spacecraft control systems support could include tracking and command processing, battery charge management and pressure transducer processing.

Input to the spacecraft control processor 202 may come from a any combination of a number of spacecraft components and subsystems, such as a transfer orbit sun sensor 204, an acquisition sun sensor 206, an inertial reference unit 208, a transfer orbit Earth sensor 210, an operational orbit Earth sensor 212, a normal mode wide angle sun sensor 214, a magnetometer 216, and one or more star sensors 218.

The SCP 202 generates control signal commands 220 which are directed to a command decoder unit 222. The command decoder unit operates the load shedding and battery charging systems 224. The command decoder unit also sends signals to the magnetic torque control unit (MTCU) 226 and the torque coil 228.

The SCP 202 also sends control commands 230 to the thruster valve driver unit 232 which in turn controls the liquid apogee motor (LAM) thrusters 234 and the attitude control thrusters 236.

Wheel torque commands 262 are generated by the SCP 202 and are communicated to the wheel speed electronics 238 and 240. These effect changes in the wheel speeds for wheels in momentum wheel assemblies 242 and 244, respectively. The speed of the wheels is also measured and fed back to the SCP 202 by feedback control signal 264.

The spacecraft control processor also sends jackscrew drive signals 266 to the momentum wheel assemblies 243 and 244. These signals control the operation of the jackscrews individually and thus the amount of tilt of the momentum wheels. The position of the jackscrews is then fed back through command signal 268 to the spacecraft control processor. The signals 268 are also sent to the telemetry encoder unit 258 and in turn to the ground station 260.

The spacecraft control processor also sends command signals 254 to the telemetry encoder unit 258 which in turn sends feedback signals 256 to the SCP 202. This feedback loop, as with the other feedback loops to the SCP 202 described earlier, assist in the overall control of the spacecraft. The SCP 202 communicates with the telemetry encoder unit 258, which receives the signals from various spacecraft components and subsystems indicating current operating conditions, and then relays them to the ground station 260.

The wheel drive electronics 238, 240 receive signals from the SCP 202 and control the rotational speed of the momentum wheels. The jackscrew drive signals 266 adjust the orientation of the angular momentum vector of the momentum wheels. This accommodates varying degrees of attitude steering agility and accommodates movement of the spacecraft as required.

The use of reaction wheels or equivalent internal torquers to control a momentum bias stabilized spacecraft allows inversion about yaw of the attitude at will without change to the attitude control. In this sense, the canting of the momentum wheel is entirely equivalent to the use of reaction wheels.

Other spacecraft employing external torquers, chemical or electric thrusters, magnetic torquers, solar pressure, etc. cannot be inverted without changing the control or reversing the wheel spin direction. This includes momentum bias spacecraft that attempt to maintain the spacecraft body fixed and steer payload elements with payload gimbals.

The SCP 202 may include or have access to memory 270, such as a random access memory (RAM). Generally, the SCP 202 operates under control of an operating system 272 stored in the memory 270, and interfaces with the other system components to accept inputs and generate outputs, including commands. Applications running in the SCP 202 access and manipulate data stored in the memory 270. The spacecraft 10 may also comprise an external communication device supporting a satellite command link for communicating with other computers at, for example, a ground station. If necessary, operation instructions for new applications can be uploaded from ground stations.

In one embodiment, instructions implementing the operating system 272, application programs, and other modules are tangibly embodied in a computer-readable medium, e.g., data storage device, which could include a RAM, EEPROM, or other memory device. Further, the operating system 272 and the computer program are comprised of instructions which, when read and executed by the SCP 202, causes the spacecraft processor 202 to perform the steps necessary to implement and/or use the present invention. Computer program and/or operating instructions may also be tangibly embodied in memory 270 and/or data communications devices (e.g. other devices in the spacecraft 10 or on the ground), thereby making a computer program product or article of manufacture according to the invention. As such, the terms "program storage device," "article of manufacture" and "computer program product" as used herein are intended to encompass a computer program accessible from any computer readable device or media.

Attitude Determination System

Figure 3:
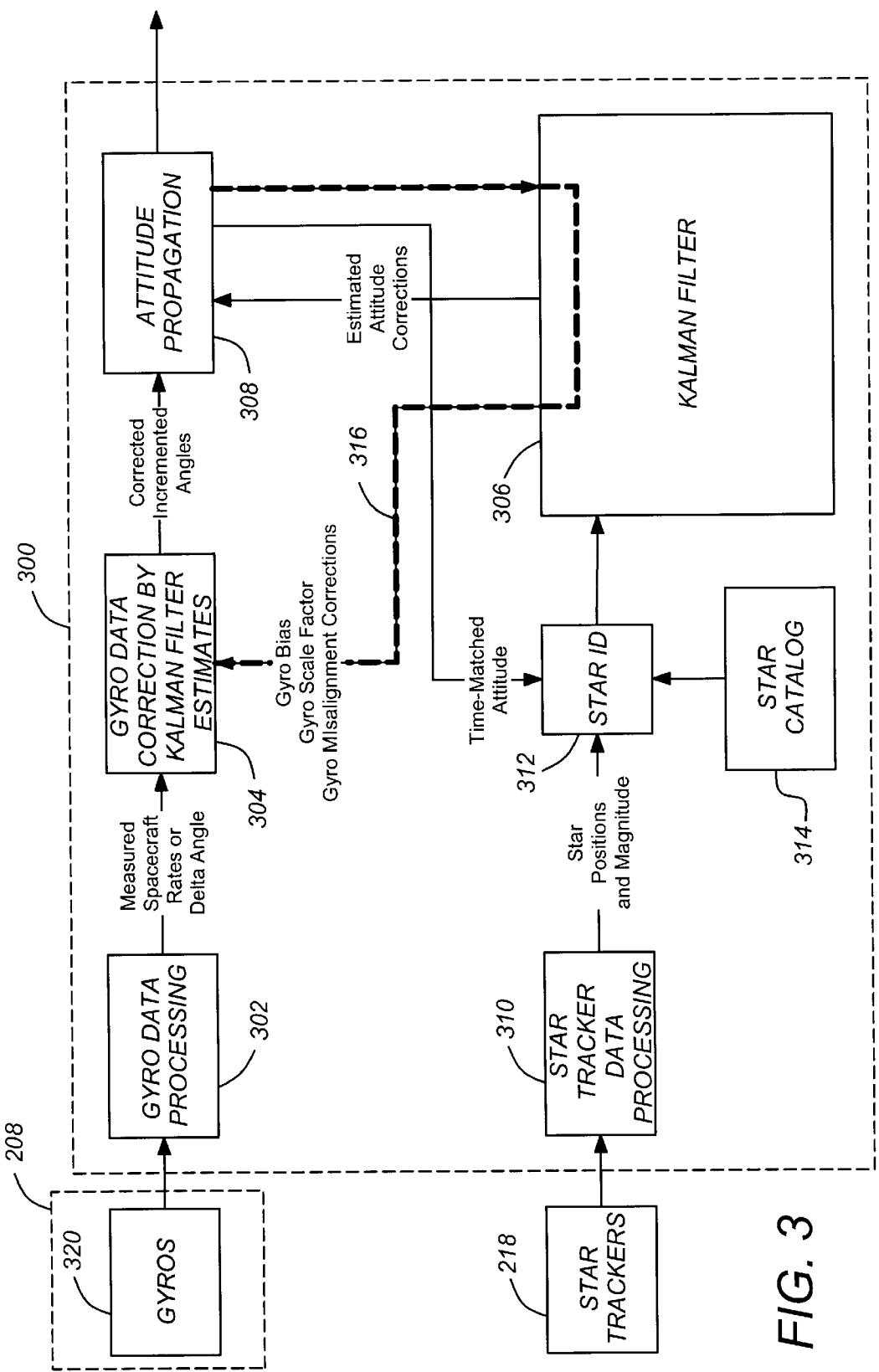
FIG. 3 is a block diagram of an attitude determination system.

FIG. 3 is a block diagram of an attitude determination system 300. The attitude determination system 300 is communicatively coupled to the rate sensors (e.g. gyros) 320 and star trackers 218. The gyros (which are typically part of the inertial reference unit 208) provide measurements of the rotation rate of the satellite, 100. Typically, such measurements are taken in three separate orthogonal axes by three different instruments. Often, the gyros are integrated with accelerometers to comprise the inertial reference unit 208.

The attitude determination system 300 includes a gyro data processor 302 communicatively coupled to the gyro(s) 320 to receive satellite rotation rate data. The gyro data processor processes the raw spacecraft rotation rate measurement data to provide processed rate data or changes in spacecraft attitude (delta angles). This data is provided to a gyro data correction module 304. The gyro data correction module 304 further processes the spacecraft rotation rate data to account for gyro biases, gyro scale factors, and gyro misalignments. The estimates of the gyro biases, gyro scale factors, and gyro misalignments are provided by a Kalman filter 306.

The attitude determination system 300 also includes an attitude propagation module 308 communicatively coupled to the gyro data correction module 304. The attitude propagation module 308 accepts corrected gyro data (spacecraft 100 rotation rates or incremental angles) from the gyro data correction module 304 as well as estimated attitude corrections from the Kalman filter 306, and generates an attitude estimate.

The Kalman filter generates the foregoing estimates from information provided by the attitude propagation module 308 (which provides data ultimately derived primarily from the gyro 320 data) and a star identification module 312 (which provides attitude data derived from the star trackers 218). The star identification module 312 provides the attitude information by comparing measured star positions from the star trackers 218 and star tracker data processor 310 with information in the star catalog 314.

The foregoing elements create an inner loop 316 compensator which can provide reasonably good estimates of spacecraft 100 attitude, changes in scale factor linearity are not adequately accounted for in highly agile spacecraft applications. In some cases, the errors in spacecraft attitude determination induced by such errors exceed the minimum performance requirements.

Figure 4:
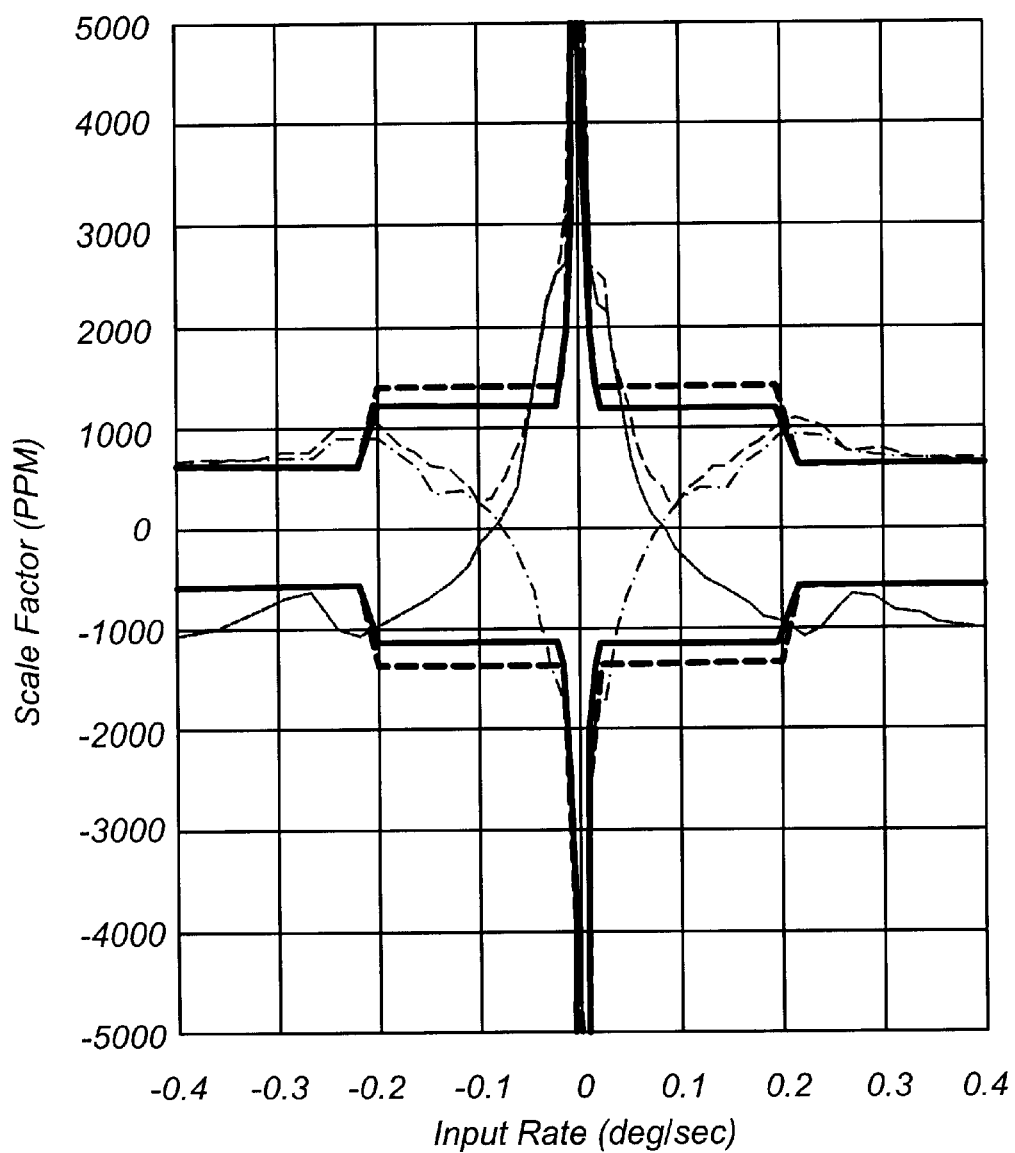
FIG. 4 is a graph illustrating typical gyro scale factor non-linearity errors.
Figure 4:
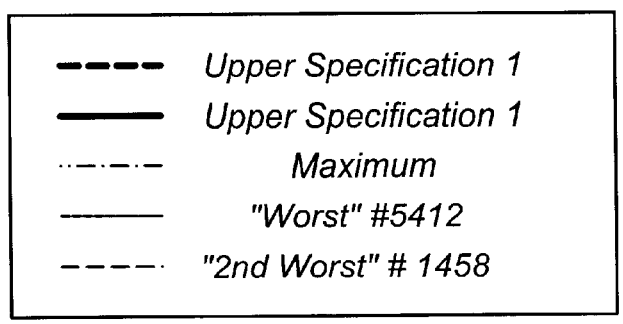

FIG. 4 is a graph illustrating typical gyro scale factor non-linearity errors. The horizontal axis represents the rotation rate input into the gyro, and the vertical axis represents the scale factor error in parts per million (PPM). As shown in FIG. 4, gyro scale factor errors (in terms of parts per million) are largest for small angular rate inputs. FIG. 4 also shows that scale factor error is a function of the input rate.

Figure 5:
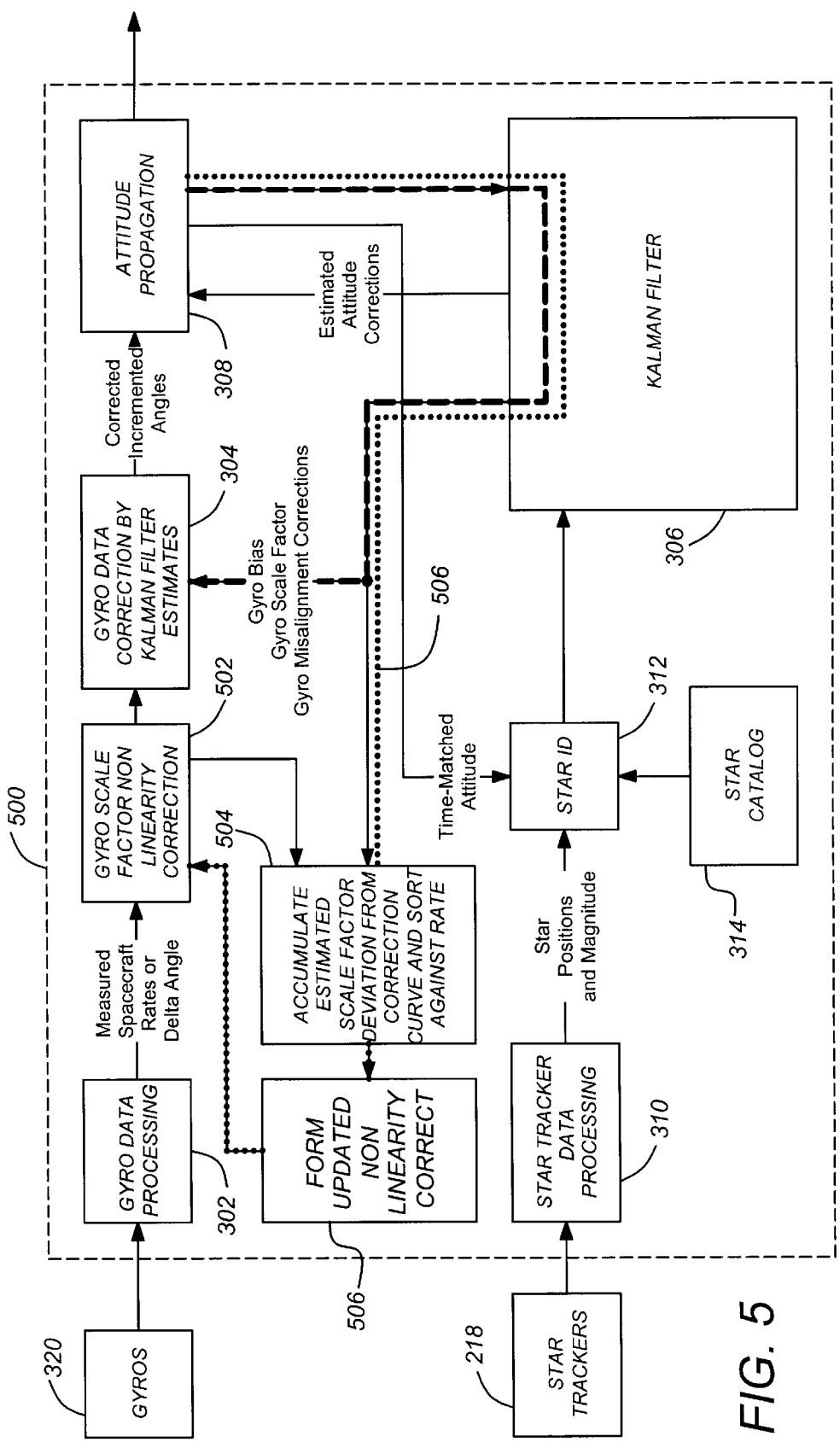
FIG. 5 is a diagram illustrating an attitude determination system having an outer loop compensator for gyro scale factor non-linearity errors.

FIG. 5 is a diagram illustrating an attitude determination system 500 having an outer loop 506 compensator for gyro scale factor non-linearity errors. In addition to the elements described in FIG. 3, the attitude determination system 500 includes a gyro scale factor non-linearity correction module 502 in communication with the gyro data processing module 302 and the gyro data correction module 304. The gyro data correction module 502 accepts updated gyro non-linearity correction information and provides the current gyro non-linearity correction to a deviation module 504. The deviation module 504 accepts the estimated gyro scale factor information from the Kalman filter 306 and the current gyro non-linearity correction, and computes an estimate of the deviation between the estimated gyro scale factor and the currently implemented correction.

An updated scale factor non-linearity correction is then created, as represented in block 506, and provided to the gyro scale factor non-linearity correction module 502. In one embodiment, the updated scale factor non-linearity correction is a lookup table relating the rate input measurement with the required correction (or compensated rate measurement), and an interpolator in block 502 generates the precise value for rate inputs between data points. In another embodiment, the correction is a curve fitted to the data points, and the value is determined by evaluating the fitted curve.

Preferably, the estimated gyro scale factor information is obtained at a plurality of different spacecraft 100 rotation rates using the inner loop 316. The estimated scale factors are associated with the corresponding spacecraft 100 rates and collected. From time to time, the estimated scale factors and rotation rates can then be sorted and used to generate an updated scale factor that is a function of input rate. These operations can be performed periodically (e.g. weekly, monthly), or as the need arises. For example, temporal variations in the rate sensor scale factor estimates can be examined to determine if they are converging, and the updated scale factor and/or scale factor linearity mapping determined only if the estimates are sufficiently converged. Further, the foregoing operations can be performed in a processor on-board the satellite 100 or on the ground, or a combination of both.

Figure 6:
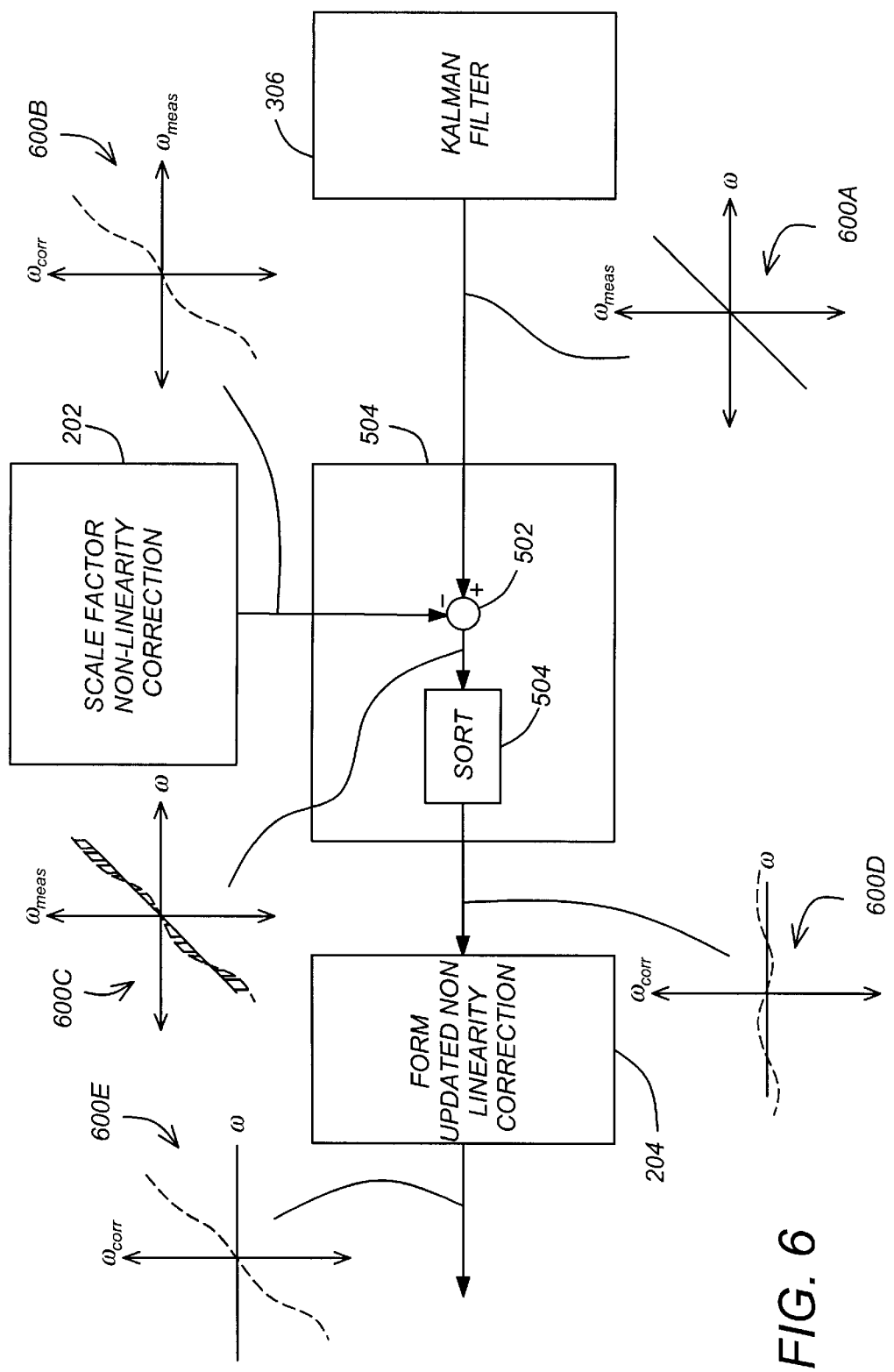
FIG. 6 is a diagram presenting a further illustration of how the gyro scale factor non-linearity correction can be generated.

FIG. 6 is a diagram presenting a further illustration of how the gyro scale factor non-linearity correction is generated. The Kalman filter 306 generates an estimate of the gyro scale factor, and that estimate is provided to the derivation module 504. The gyro scale factor 600A is indicated in FIG. 6 as a plot of a relationship between the measured angular rate $\omega_{meas}$ and the actual rate $\omega$ (since the Kalman filter does not provide an estimate of gyro scale factor non-linearity, the plot is a straight line, indicating that there is a linear relationship between the input rate $\omega$ and the measured angular rate $\omega_{meas}$). The gyro scale factor non-linearity scale factor correction module 502 provides the current scale factor correction 600B to the derivation module as well. The current scale factor correction is illustrated in FIG. 6 as a plot showing a relationship between the measured spacecraft angular rotation rates (perhaps after pre-processing) and the measured rate. This data is provided to differencer 602. The difference between these two data sets represents the difference between the current scale factor non-linearity correction and the currently estimated scale factor, and is shown in plot 600C. The sorter 604 sorts the data according to the input rate $\omega$, resulting in the plot 600D, and an updated non-linearity correction is formed in block 506, resulting in plot 600E.

Figure 7:
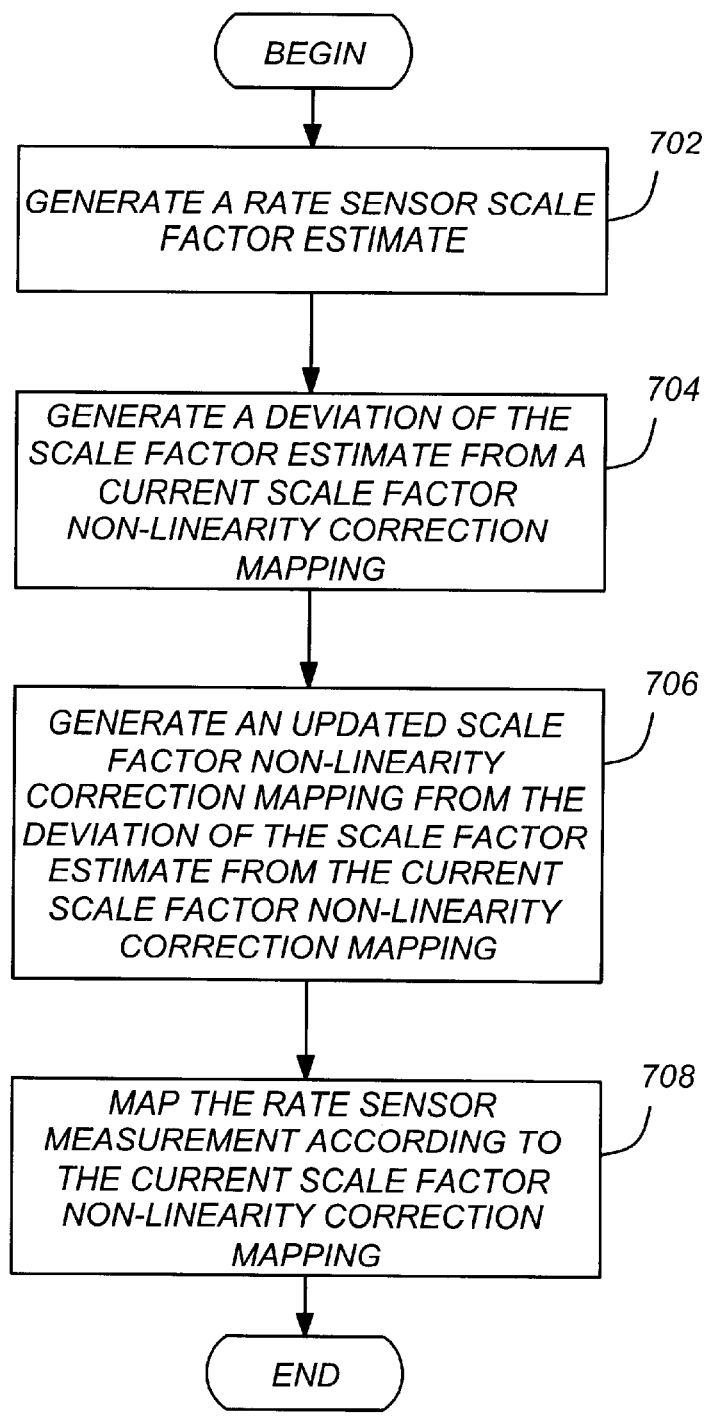
FIG. 7 is a flow chart presenting illustrative process steps that could be used to practice one embodiment of the present invention.

FIG. 7 is a flow chart presenting illustrative process steps that could be used to practice one embodiment of the present invention. A rate sensor scale factor estimate is generated, as illustrated in block 702. In one embodiment, this is accomplished by a Kalman filter 306, however, other optimal estimation techniques can be used. A deviation of the scale factor estimate from a current scale factor non-linearity correction mapping is then determined, as shown in block 704. In one embodiment this is accomplished by determining a difference between the scale factor estimate and a current scale factor non-linearity correction mapping and associating the difference with an estimated rate sensor measurement.

An updated scale factor non-linearity correction mapping is then generated from the deviation of the scale factor estimate from the current scale factor non-linearity correction mapping, as shown in block 706. The mapping can take one or more of several forms, including a set of discrete data points relating the rate measurements and the non-linearity correction, or a continuous curve. In the case of the discrete mapping, corrections for data falling between representative values for rate measurements can be obtained by interpolation or extrapolation as required. In the case of curve fitting, a curve can be fit to the data points (e.g. exponential, power curve, or polynomial curve fitting routines using minimum mean squared error criteria).

Then, as depicted in block 708, the rate sensor measurements are mapped according to the current scale factor non-linearity correction mapping.

In one embodiment, all of the foregoing operations are performed on a single spacecraft control processor 202 on the spacecraft 100 itself, however, this need not be the case. Any of the foregoing operations can be implemented in a special purpose processor with an associated memory (or shared memory with any of the other processors), or may be completely or partially implemented by a processor on the ground and by transmitting data between the satellite 100 and the ground station.

Conclusion

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of calibrating a rate sensor measurement to compensate for rate sensor scale factor non-linearity, comprising the steps of:

determining a deviation of a rate sensor scale factor estimate from a current rate sensor scale factor non-linearity correction mapping;

generating an updated scale factor non-linearity correction mapping from the deviation of the rate sensor scale factor estimate from the current rate sensor scale factor non-linearity correction mapping; and mapping the rate sensor measurement according to the current rate sensor scale factor non-linearity correction mapping.

2. The method of claim 1, wherein the step of determining a deviation of the rate sensor scale factor estimate from a current scale factor non-linearity correction mapping comprises the steps of:

determining a difference between the rate sensor scale factor estimate and current rate sensor scale factor non-linearity correction mapping; and associating the difference with an estimated rate sensor measurement.

3. The method of claim 1, wherein the current rate sensor scale factor non-linearity correction mapping is expressed in discrete data points, and the step of mapping the rate sensor measurements according to the current rate sensor scale factor non-linearity correction mapping comprises the steps of:

interpolating between the discrete data points.

4. The method of claim 1, further comprising the step of:

curve fitting the updated rate sensor scale factor non-linearity correction mapping to a function; and wherein the step of mapping the rate sensor measurement according to the current rate sensor scale factor non-linearity mapping comprises the step of evaluating the function at the rate sensor measurement.

5. The method of claim 1, wherein the step of determining a deviation of the rate sensor scale factor estimate from a current rate sensor scale factor non-linearity correction mapping is performed in a processor that is outboard the satellite and transmitted to the satellite via a command link.

6. The method of claim 1, wherein the step of determining a deviation of the rate sensor scale factor estimate from a current rate sensor scale factor non-linearity correction mapping is performed in an onboard processor.

7. The method of claim 1, wherein the step of determining a deviation of the rate sensor scale factor estimate from a current rate sensor scale factor non linearity correction mapping is performed after a plurality of rate sensor measurements are taken.

8. The method of claim 1, wherein the step of determining a deviation of the rate sensor scale factor estimate from the current rate sensor scale factor non-linearity mapping comprises the steps of:

generating a plurality of further rate sensor scale factor estimates; and if the further rate sensor scale factor estimates are converging, generating a deviation of the converged scale factor estimate from the current scale factor non-linearity correction mapping.

9. A method of determining an attitude of a spacecraft, comprising the steps of:

receiving a rate sensor measurement;

calibrating the rate sensor measurement to reduce rate sensor scale factor non-linearity errors, wherein the step of calibrating the rate sensor measurement comprises the steps of:

generating a rate sensor scale factor scale factor estimate;

generating a deviation of the scale factor estimate from a current scale factor non-linearity correction mapping;

generating an updated scale factor non-linearity correction mapping from the deviation of the scale factor estimate from the current scale factor non-linearity correction mapping; and mapping the rate sensor measurement according to the current scale factor non-linearity correction mapping; and generating an estimated spacecraft attitude from the mapped rate sensor measurements.

10. The method of claim 1, wherein the current rate sensor scale factor is computed from a Kalman filter at least in part from identified stars and a propagated spacecraft atttitude.

11. An apparatus for calibrating a rate sensor measurement to compensate for rate sensor scale factor non-linearity, comprising:

a first module for estimating a gyro scale factor;

a second module, communicatively coupled to the first module, for generating a deviation of the rate sensor scale factor estimate from a current rate sensor scale factor non-linearity correction mapping;

a third module, communicatively coupled to the second module for generating an updated rate sensor scale factor non-linearity correction mapping from the deviation of the rate sensor scale factor estimate from the current scale factor non-linearity correction mapping; and a fourth module, communicatively coupled to the third module, for mapping the rate sensor measurement according to the current rate sensor scale factor non-linearity correction mapping.

12. The apparatus of claim 11, wherein the fourth module is communicatively coupled to a rate sensor.

13. The apparatus of claim 1, wherein the first module is a Kalman filter implemented at least in part by a processor communicatively coupled to a memory.

14. The apparatus of claim 1, wherein the second module is implemented at least in part by the processor.

15. The apparatus of claim 1, wherein the third module is implemented at least in part by the processor.

16. The apparatus of claim 1, wherein the second module comprises a differencer communicatively coupled to the first module for determining a difference between the scale factor estimate and the current scale factor non-linearity correction mapping.

17. The apparatus of claim 1, wherein the fourth module comprises an interpolator for mapping the rate sensor measurement according to the current scale factor non-linearity correction mapping.

18. The apparatus of claim 1, wherein the fourth module comprises a means for evaluating the function at the rate sensor measurement.

19. A program storage device, readable by a computer, tangibly embodying at least one program of instructions executable by the computer to perform method steps to compensate for rate sensor scale factor non-linearity, the method steps comprising the steps of:
   determining a deviation of a rate sensor scale factor estimate from a current rate sensor scale factor non-linearity correction mapping;
   generating an updated scale factor non-linearity correction mapping from the deviation of the rate sensor scale factor estimate from the current rate sensor scale factor non-linearity correction mapping; and
   mapping the rate sensor measurement according to the current rate sensor scale factor non-linearity correction mapping.

20. An apparatus for calibrating a rate sensor measurement to compensate for rate sensor scale factor non-linearity, comprising:
   means for generating a current rate sensor scale factor estimate;
   means for generating a deviation of the scale factor estimate from a current scale factor non-linearity correction mapping;
   means for generating an updated scale factor non-linearity correction mapping from the deviation of the scale factor estimate from the current scale factor non-linearity correction mapping; and
   means for mapping the rate sensor measurement according to the current scale factor non-linearity correction mapping.

21. A method of calibrating a sensor measurement to compensate for sensor measurement scale factor non-linearities, comprising the steps of:
   collecting a plurality of sensor measurements at a plurality of sensor input magnitudes;
   determining the sensor scale factor at the plurality of sensor input magnitudes;
   associating each sensor scale factor with a respective one of the plurality of sensor input magnitudes;
   generating a sensor scale factor non-linearity mapping from the associated sensor scale factors and sensor input magnitudes; and
   mapping the rate sensor measurement according to the current scale factor non-linearity correction mapping.

22. The method of claim 21, wherein the sensor includes a rate sensor and the plurality of sensor input magnitudes includes a plurality of input rates.

23. The method of claim 22, wherein the sensor scale factor is estimated at the plurality of sensor input magnitudes by an optimal filter.

24. The method of claim 22, wherein the sensor input magnitudes are estimated according to an optimal filter.

25. The method of claim 22, wherein the sensor is disposed on a satellite, and at least the step of generating a sensor scale factor is performed by a processor on board the satellite.

26. The method of claim 22, wherein the sensor is disposed on a satellite, and at least the step of generating a sensor scale factor is performed by a ground-based processor and the generated sensor scale factor is transmitted to the satellite.

27. An apparatus for calibrating a sensor measurement to compensate for sensor measurement scale factor non-linearities, comprising:
   means for collecting a plurality of sensor measurements at a plurality of sensor input magnitudes;
   means for determining the sensor scale factor at the plurality of sensor input magnitudes;
   means for associating each sensor scale factor with a respective one of the plurality of sensor input magnitudes;
   means for generating a sensor scale factor non-linearity mapping from the associated sensor scale factors and sensor input magnitudes; and
   means for mapping the rate sensor measurement according to the current scale factor non-linearity correction mapping.

* * * * *